United States Patent
Auyeung

(10) Patent No.: US 9,584,817 B2
(45) Date of Patent: Feb. 28, 2017

(54) VIDEO TRANSMISSION SYSTEM WITH COLOR PREDICTION AND METHOD OF OPERATION THEREOF

(71) Applicant: Sony Corporation, Tokyo (JP)

(72) Inventor: Cheung Auyeung, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 285 days.

(21) Appl. No.: 14/541,741

(22) Filed: Nov. 14, 2014

(65) Prior Publication Data

US 2015/0281701 A1    Oct. 1, 2015

Related U.S. Application Data

(60) Provisional application No. 61/972,507, filed on Mar. 31, 2014, provisional application No. 61/973,952, filed on Apr. 2, 2014.

(51) Int. Cl.
| | |
|---|---|
| H04N 7/12 | (2006.01) |
| H04N 11/02 | (2006.01) |
| H04N 11/04 | (2006.01) |
| H04N 19/30 | (2014.01) |

(52) U.S. Cl.
CPC .................................. *H04N 19/30* (2014.11)

(58) Field of Classification Search
CPC ........................................................ H04N 7/50
See application file for complete search history.

(56) References Cited

U.S. PATENT DOCUMENTS

| | | | |
|---|---|---|---|
| 7,355,722 B2 | 4/2008 | Hill | |
| 7,933,456 B2 | 4/2011 | Han et al. | |
| 8,369,404 B2 | 2/2013 | Sekiguchi et al. | |
| 8,422,803 B2 | 4/2013 | Sekiguchi et al. | |
| 8,593,708 B2 | 11/2013 | Monga et al. | |
| 2007/0047639 A1* | 3/2007 | Ye | H04N 19/147 375/240.1 |
| 2011/0273622 A1 | 11/2011 | Ngo et al. | |
| 2013/0188741 A1 | 7/2013 | Minoo et al. | |
| 2013/0314495 A1* | 11/2013 | Chen | H04N 13/0048 348/43 |
| 2014/0086318 A1* | 3/2014 | Kerofsky | H04N 11/006 375/240.12 |

FOREIGN PATENT DOCUMENTS

WO        02089490 A1    11/2002

* cited by examiner

*Primary Examiner* — Chikaodili E Anyikire
(74) *Attorney, Agent, or Firm* — Haverstock & Owens LLP

(57) ABSTRACT

A video transmission system and the method of operation thereof includes: a base layer encoder unit encodes a first video frame for generating a first encoded video frame and a color reference frame including dynamically partitioning the color space of the first video frame; an enhancement layer encoding unit for generating a subsequent encoded video frame by differentially encoding a resampled color frame reference and a subsequent video frame; a video stream transport accessed by a bit stream multiplex unit for multiplexing the first encoded video frame and the subsequent encoded video frame; a reference capture unit to generate a decoded video stream by capturing the resampled color frame reference, for decoding the video stream transport, by applying the subsequent encoded video frame to the resampled color frame reference; and a display, coupled to the reference capture unit and the decoded video stream from the video stream transport, for displaying the decoded video stream.

16 Claims, 3 Drawing Sheets

VIDEO TRANSMISSION SYSTEM WITH COLOR PREDICTION AND METHOD OF OPERATION THEREOF

CROSS-REFERENCE TO RELATED APPLICATION(S)

This application claims the benefit of U.S. Patent Application Ser. No. 61/972,507 filed Mar. 31, 2014, and the subject matter thereof is incorporated herein by reference in its entirety.

This application claims the benefit of U.S. Patent Application Ser. No. 61/973,952 filed Apr. 2, 2014, and the subject matter thereof is incorporated herein by reference in its entirety.

TECHNICAL FIELD

The present invention relates generally to a video transmission system, and more particularly to a system for encoding video transmissions for data compression.

BACKGROUND ART

With the advanced development of camera technology, the amount of data associated with a single frame has grown dramatically. A few years ago camera technology was limited to a few thousand pixels per frame. That number has shot past 10 million pixels pre frame on a relatively inexpensive camera and professional still and movie cameras are well beyond 20 million pixels per frame.

This increase in the number of pixels has brought with it breath-taking detail and clarity of both shapes and colors. As the amount of data needed to display a high definition frame has continued to grow, the timing required to display the data on a high definition television has dropped from 10's of milliseconds to less than 2 milliseconds. The unprecedented clarity and color rendition has driven the increase in the number of pixels that we desire to view.

In order to transfer the now massive amount of data required to identify the Luma (Y), the Chroma blue ($C_b$), and the Chroma red ($C_r$) for every pixel in the frame, some reduction in the data must take place. Several techniques have been proposed, which trade a reduction in detail for full color, a reduction in color for more detail, or a reduction in both detail and color. There is yet to be found a balanced approach that can maintain the detail and represent the full color possibilities of each frame.

Thus, a need still remains for video transmission system with color prediction that can minimize the transfer burden while maintaining the full detail and color content of each frame of a video stream. In view of the ever increasing demand for high definition movies, photos, and video clips, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

DISCLOSURE OF THE INVENTION

The embodiments of the present invention provide a method of operation of a video transmission system including: encoding a first video frame for generating a first encoded video frame and a color frame reference including dynamically partitioning of the color space of the first video frame; generating a subsequent encoded video frame by differentially encoding a resampled color frame reference, from the color frame reference, and a subsequent video frame; accessing a video stream transport by multiplexing the first encoded video frame and the subsequent encoded video frame; generating a decoded video stream by capturing the resampled color frame reference, for decoding the video stream transport, by applying the subsequent encoded video frame to the resampled color frame reference; and presenting on a display the decoded video stream from the video stream transport.

The embodiments of the present invention provide a video transmission system, including: a base layer encoder unit encodes a first video frame for generating a first encoded video frame and a color frame reference including dynamically partitioning of the color space of the first video frame; an enhancement layer encoding unit, coupled to the base layer encoder unit, for generating a subsequent encoded video frame by differentially encoding a resampled color frame reference, from the color frame reference, and a subsequent video frame; a video stream transport accessed by a bit stream multiplex unit for multiplexing the first encoded video frame and the subsequent encoded video frame; a reference capture unit, coupled to the video stream transport, to generate a decoded video stream by capturing the resampled color frame reference, for decoding the video stream transport, by applying the subsequent encoded video frame to the resampled color frame reference; and a display, coupled to the reference capture unit and the decoded video stream from the video stream transport, for displaying the decoded video stream.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
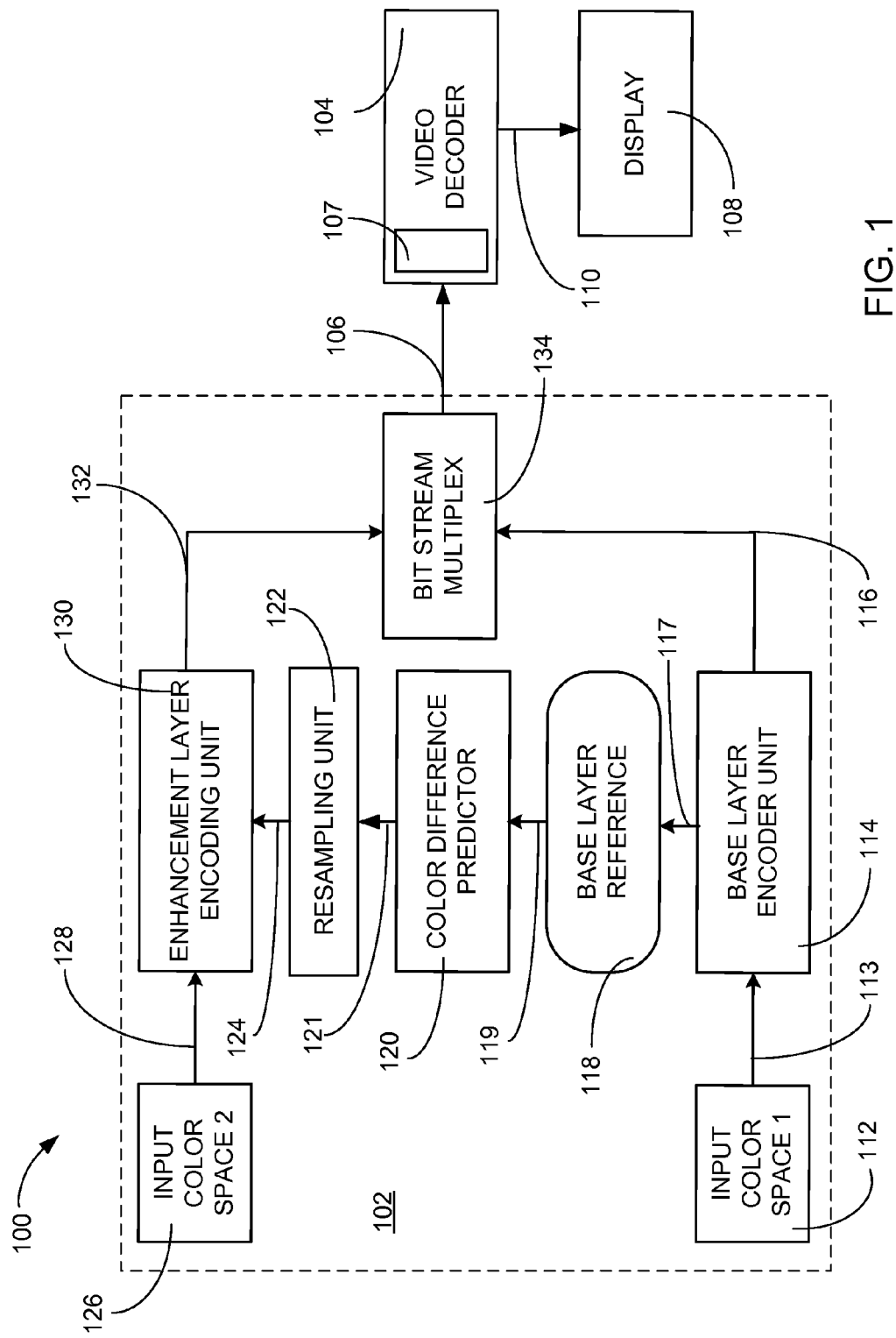
FIG. 1 is a functional block diagram of a video transmission system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation.

Where multiple embodiments are disclosed and described, having some features in common, for clarity and ease of illustration, description, and comprehension thereof, similar and like features one to another will ordinarily be described with similar reference numerals.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "unit" referred to herein means a hardware device, such as an application specific integrated circuit, combinational logic, core logic, integrated analog circuitry, or a dedicated state machine.

The term "partition" referred to herein can mean a part of a video frame or a part of the components of the video frame, such as Luminance (Y) and Chrominance ($C_b$ and $C_r$).

Referring now to FIG. 1, therein is shown a functional block diagram of a video transmission system 100 in an embodiment of the present invention. The functional block diagram of a video transmission system 100 depicts a video transmission unit 102 linked to a video decoder unit 104 by a video stream transport 106, which carries the compressed bit stream. The video decoder unit 104 can activate a reference capture unit 107 for interpreting the video stream transport 106. The video decoder unit 104 can be coupled to a display 108, such as a high definition television, a computer display, a tablet display, a smart phone display, or the like, by a decoded picture stream 110.

The video stream transport 106 can be a wired connection, a wireless connection, a digital video disk (DVD), FLASH memory, or the like. The video stream transport 106 can capture the coded video stream from the video transmission unit 102.

An embodiment of the video transmission unit 102 can include a first input color space unit 112, which can receive a first video frame 113 or a portion of a video frame. The first input color space unit 112 can be coupled to a base layer encoder unit 114, which can determine a Luma (Y') level for the first video frame 113 captured by the first input color space unit 112. The base layer encoder unit 114 can output a first encoded video frame 116 as a reference for the contents of the video stream transport 106. The first encoded video frame 116 can be loaded into the reference capture unit 107, of the video decoder unit 104, in order to facilitate the decoding of the contents of the video stream transport 106.

The base layer encoder unit 114 can extract a set of base frame parameters 117 from the first video frame 113 during the encoding process. The base frame parameters 117 can include range values of Luminance (Y) and Chrominance ($C_b$ and $C_r$) as well as average and median values.

The base layer encoder unit 114 can be coupled to a base layer reference register 118, which captures and holds the base frame parameters 117 of the first video frame 113 held in the first input color space unit 112. The base layer reference register 118 maintains the base frame parameters 117 including values of the Luminance (Y) and Chrominance ($C_b$ and $C_r$) derived from the first input color space unit 112.

The base layer reference register 118 can provide a reference frame parameter 119 which is coupled to a color difference predictor unit 120. The color difference predictor unit 120 can analyze the color gamut represented by the reference frame parameters 119, of the first video frame 113 captured in the first input color space unit 112, for calculating a color reference frame 121. The color reference frame 121 can provide a basis for a resampling unit 122 to generate a resampled color frame reference 124. The resampling unit 122 can interpolate the color reference frame 121 on a pixel-by-pixel basis to modify the resolution or bit depth of the resampled color frame reference 124. The resampled color frame reference 124 can match the color space, resolution, or bit depth of subsequent video frames 128 based on the Luminance (Y') and Chrominance ($C'_b$ and $C'_r$) of the first video frame 113 associated with the same encode time. The first video frame 113 and the subsequent video frames 128 can be matched on a frame-by-frame basis, but can differ in the color space, resolution, or bit depth. By way of an example, the reference frame parameter 119 can be captured in BT.709 color HD format using 8 bits per pixel, while the resampled color frame reference 124 can be presented in BT.2020 color 4K format using 10 bits per pixel. It is understood that the frame configuration of the resampled color frame reference 124 and the subsequent video frames 128 are the same.

A second input color space unit 126 can receive the subsequent video frames 128 of the same video scene as the first video frame 113 in the same or different color space, resolution, or bit depth. The subsequent video frames 128 can be coupled to an enhancement layer encoding unit 130. Since the colors in the video scene represented by the first video frame 113 and the subsequent video frames 128 are related, the enhancement layer encoding unit 130 can differentially encode only the difference between the resampled color frame reference 124 and the subsequent video frames 128. This can result in a compressed version of a subsequent encoded video frame 132 because the differentially encoded version of the subsequent video frames 128 can be applied to the first encoded video frame 116 for decoding the subsequent video frames 128 while transferring fewer bits across the video stream transport 106.

The color difference predictor unit 120 can provide a gain-offset mapping for Luma (Y'), Chroma B ($C'_b$), and Chroma R ($C'_r$) of the color reference frame 121 from the Luminance (Y) and Chrominance ($C_b$ and $C_r$) of the reference frame parameter 119 as follows:

$$\begin{bmatrix} Y' \\ C'_b \\ C'_r \end{bmatrix} = \begin{bmatrix} g_{00} & 0 & 0 \\ 0 & g_{11} & 0 \\ 0 & 0 & g_{22} \end{bmatrix} \begin{bmatrix} Y \\ C_b \\ C_r \end{bmatrix} + \begin{bmatrix} b_0 \\ b_1 \\ b_2 \end{bmatrix} \quad \text{(Equation 1)}$$

Where the parameters gain $g_{xx}$ and offset $b_x$ can be obtained by minimizing the sum of square differences between the reference frame parameter 119 and frames derived from the subsequent video frames 128 associated with the same encode time.

A matrix mapping with cross-color prediction for Luminance (Y) and Chrominance ($C_b$ and $C_r$) can be calculated by the color difference predictor unit 120 using the second equation as follows:

$$\begin{bmatrix} Y' \\ C'_b \\ C'_r \end{bmatrix} = \begin{bmatrix} g_{00} & g_{01} & g_{02} \\ g_{10} & g_{11} & g_{12} \\ g_{20} & g_{21} & g_{22} \end{bmatrix} \begin{bmatrix} Y \\ C_b \\ C_r \end{bmatrix} + \begin{bmatrix} b_0 \\ b_1 \\ b_2 \end{bmatrix} \quad \text{(Equation 2)}$$

A bit stream multiplex unit 134 multiplexes the first encoded video frame 116 and the subsequent encoded video frame 132 for the generation of the video stream transport 106. During operation, the bit stream multiplex unit 134 can pass a look-up table (LUT) that can be used as a reference to predict the subsequent encoded video frame 132 from the first encoded video frame 116. This can minimize the amount of data sent in the video stream transport 106 because the pixels in the first input color space unit 112 and the second input color space unit 126 represent the same scene, so the pixels in the first color space unit 112 can be used to predict the pixels in the second input color space unit 126.

Since the color relationship between the first video frame 113 and the subsequent video frames 128 may not change drastically over time, the LUT for mapping color from the reference frame parameter 119 to the color reference frame 121 is only transferred at the beginning of the video scene or when update is needed. The LUT can be used for any follow-on frames in the video scene until it is updated.

It has been discovered that an embodiment of the video transmission unit 102 can reduce the transfer overhead and therefore compress the transfer of the video stream transport 106 by transferring the first encoded video frame 116 as a reference. This allows the subsequent encoded video frame 132 of the same video scene to be transferred to indicate only the changes with respect to the associated first encoded video frame 116.

Figure 2:
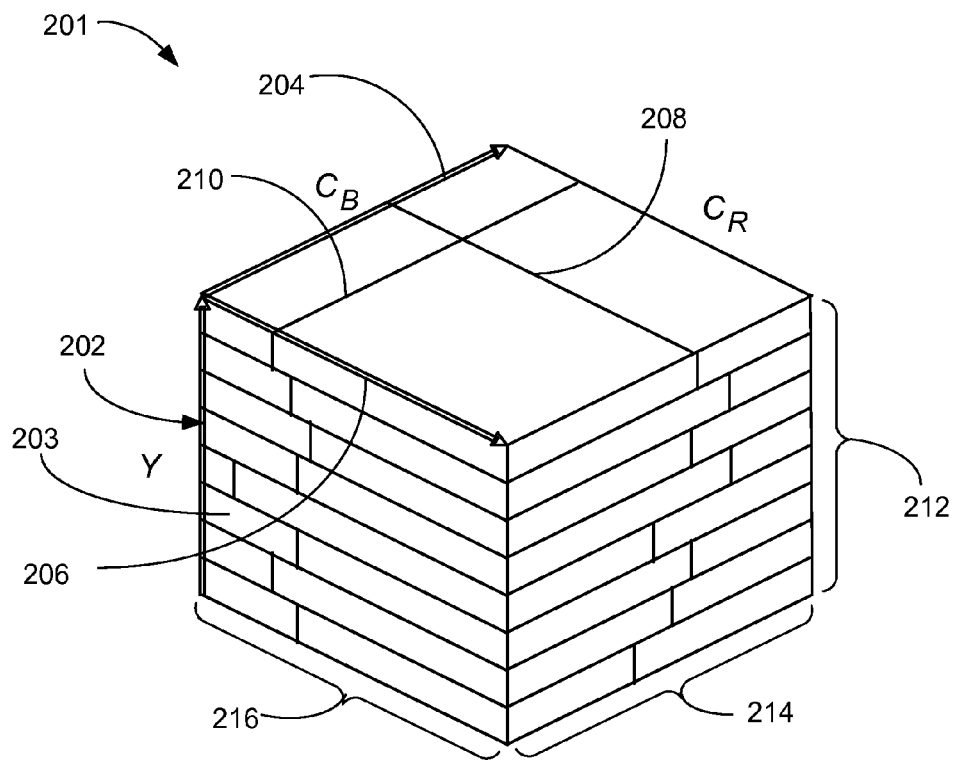
FIG. 2 is an exemplary partition of a color gamut for color prediction by the video transmission system in an embodiment.

Referring now to FIG. 2, therein is shown an exemplary partition of a color space 201 for color prediction by the video transmission system 100 of FIG. 1 in an embodiment. The exemplary partition of the color space 201 provides that the color in each partition can be mapped by Equation 2 to map the pixel values in the reference frame parameter 119 of FIG. 1 to the color reference frame 121 of FIG. 1 by the color difference predictor unit 120 of FIG. 1.

The parameters in Equation 2 for each of the partitions are collected into a three dimensional (3D) LUT and signaled in the bit stream 106. The exemplary partition of the color space 201 depicts a Luminance (Y) axis 202 that can be divided into eight uniform steps. A Chroma $C_b$ axis 204 can proceed away from the Luminance (Y) axis 202 at a 90 degree angle. A Chroma $C_r$ axis 206 can proceed away from the Luminance (Y) axis 202 and the Chroma $C_b$ axis 204 at a 90 degree angle to both.

The partition of the color space 201 can be figuratively represented by a cube divided into multiple partitions. For each equal step 203 of the Luminance (Y) axis 202, the value of a $C_b$ partition 208 represents an average of the $C_b$ captured in the base layer reference register 118 of FIG. 1 as calculated by the color difference predictor unit 120. For each of the equal step 203 of the Luminance (Y) axis 202, the value of a $C_r$ partition 210 represents an average of the $C_r$ captured in the base layer reference register 118 as calculated by the color difference predictor unit 120. The value of each of the $C_b$ partition 208 and the $C_r$ partition 210 is dependent on the value of the Luminance (Y) for the particular step. As a result each of the equal step 203 of the Luminance (Y) axis 202 can generate a different value of the $C_b$ partition 208 and the $C_r$ partition 210.

The partition of the color space 201 can provide a Luminance (Y) range 212, a Chroma $C_b$ range 214, and a Chroma $C_r$ range 216, which are derived from the base layer reference register 118. The partition of the color space 201 is specific to the first video frame 113 of FIG. 1. Since the first video frame 113 and the subsequent video frames 128 of FIG. 1 are from the same scene, the lighting and color shades of the two frames are correlated. By taking this into account, the color difference predictor unit 120 can provide a prediction for the encoding process of the subsequent encoded video frame 132 of FIG. 1.

The enhancement layer encoding unit 130 of FIG. 1 can differentially encode the $C_b$ partition 208 and the $C_r$ partition 210 using a mean value of the pixels represented by the Chroma $C_b$ range 214 and the Chroma $C_r$ range 216 as references so that most of the individual encoded values are small positive or small negative values. The choice of two partitions for the Chroma B axis 204 and the Chroma R axis 206 can minimize the amount of data transferred to the video stream transport 106 while preserving the detail in the frame being transmitted.

It has been discovered that an embodiment of the video transmission system 100 can reduce the amount of data generated by differentially encoding the subsequent encoded video frame 132 of FIG. 1 for predicting from the first encoded video frame 116. By transferring the prediction parameters of the color prediction unit 120 as a LUT to be applied to the first encoded video frame 116, with the LUT updated as needed by scene changes, the content of the subsequent encoded video frame 132 in the video stream transport 106 of FIG. 1 can be minimized. Further the partition of the color space 201 can be a dynamic partition based on the mean value of the Chroma $C_b$ range 214 and the Chroma $C_r$ range 216, which can be different for different video scenes.

Figure 3:
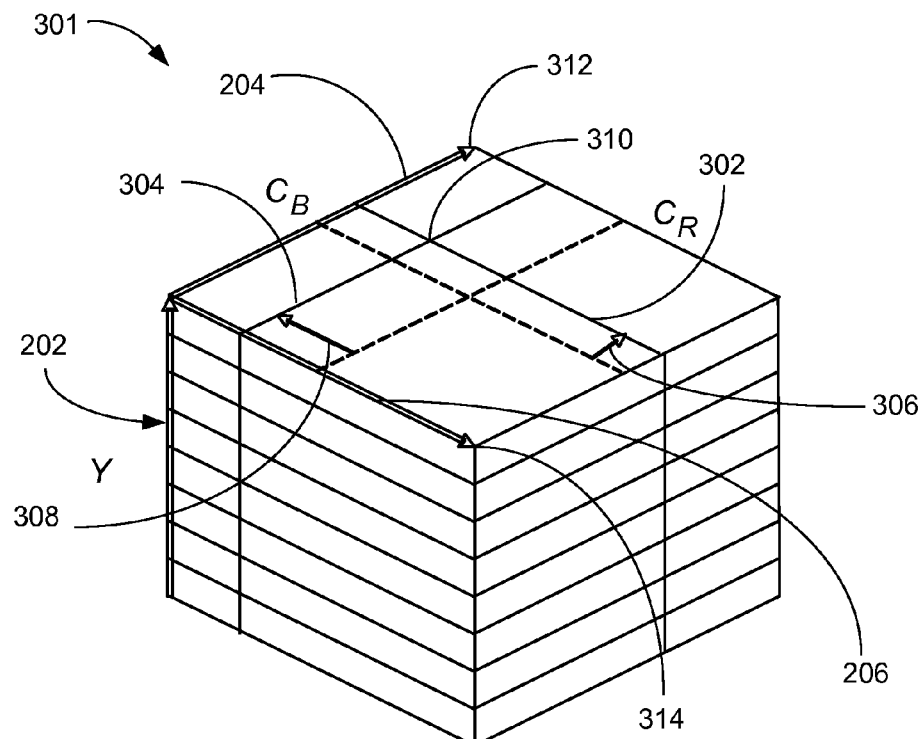
FIG. 3 is an exemplary partition of a color gamut for color prediction by the video transmission system in an alternative embodiment.

Referring now to FIG. 3, therein is shown an exemplary partition of the color gamut 301 for color prediction by the video transmission system 100 of FIG. 1 in an alternative embodiment. The exemplary color gamut 301 depicts the Luminance (Y) axis 202 that can be divided into eight uniform steps. The Chroma $C_b$ axis 204 can proceed away from the Luminance (Y) axis 202 at a 90 degree angle. The Chroma $C_r$ axis 206 can proceed away from the Luminance (Y) axis 202 and the Chroma $C_b$ axis 204 at a 90 degree angle to both.

The partition of the color space 201 can be figuratively represented by a cube divided into multiple partitions. For each of the equal step 203 of the Luminance (Y) axis 202, the value of a $C_{b0}$ partition 302 represents a median value of all the $C_b$ captured in the base layer reference register 118 of FIG. 1 as calculated by the color difference predictor unit 120 of FIG. 1. For each of the equal step 203 of the Luminance (Y) axis 202, the value of a $G_{r0}$ partition 304 represents a median value of all the $C_r$ captured in the base layer reference register 118 as calculated by the color difference predictor unit 120. The value of each of the $C_b$ partition 208 and the $C_r$ partition 210 is independent on the value of the Luminance (Y) for the particular step so they remain constant across the range of the Luminance (Y) axis 202.

An encoding of the first encoded video frame 116 of FIG. 1 must transfer all of the pixel information as a reference for the subsequent encoded video frame 132 of FIG. 1, that are associated with the same video scene, in order to differentially encode the subsequent encoded video frame 132. The color difference predictor unit 120 using equation 2, above, and the resampling unit 122 can calculate the resampled color frame reference 124 as a reference for the enhancement layer encoding unit 130 of FIG. 1.

An even integer N can be the number of locations for the partitions of the Chroma $C_b$ axis 204. In an embodiment, the value of N can be equal to Cbmax 312. An integer n can be the value of a partition intersect 310. The partition for Chroma $C_b$ axis 204 can be calculated by:

$$Cb = n*Cbmax/N \qquad \text{(Equation 3)}$$

Where the value of Cbmax 312 is the highest value plus one on the Chroma B axis 204 that can be present in the subsequent encoded video frame 132.

An even integer M can be the number of locations for the partitions of the Chroma $C_r$ axis 206. In one embodiment, the value of M can be equal to Crmax 314. An integer m can be the value of the partition intersect 310. The partition for Chroma $C_r$ axis 206 can be calculated by:

$$Cr = m*Crmax/M \qquad \text{(Equation 4)}$$

Where the value of Crmax 314 is the highest value plus one on the Chroma $C_r$ axis 206.

The Cb relative position 306 of the partition intersect 310 can be differentially encoded and signaled by (n−N/2). The Cr relative position 308 of the partition intersect 310 can be differentially encoded and signaled by (m−M/2).

It has been discovered that the alternative embodiment of the video transmission system 100 can further minimize the amount of data encoded in the subsequent encoded video frame 132 because only a single partition value for Chroma $C_b$ axis 204 and a single partition value for Chroma $C_r$ axis 206 can be transferred as opposed to a different partition for each of the equal step 203 of the Luminance (Y) axis 202. This reduction in coding overhead results in better balance of bitrate and the detail transferred in the video stream transport 106 of FIG. 1. The data transfer of the LUT can be reduced by the minimization of the single partition value for Chroma $C_b$ axis 204 and the single partition value for Chroma $C_r$ axis 206 used in the differential encoding of the subsequent encoded video frame 132. Further the partition of the color space 201 can be a dynamic partition based on the mean or the median value of the Chroma $C_b$ range 312 and the Chroma $C_r$ range 314, which can be different for the LUT representing different video scenes.

Figure 4:
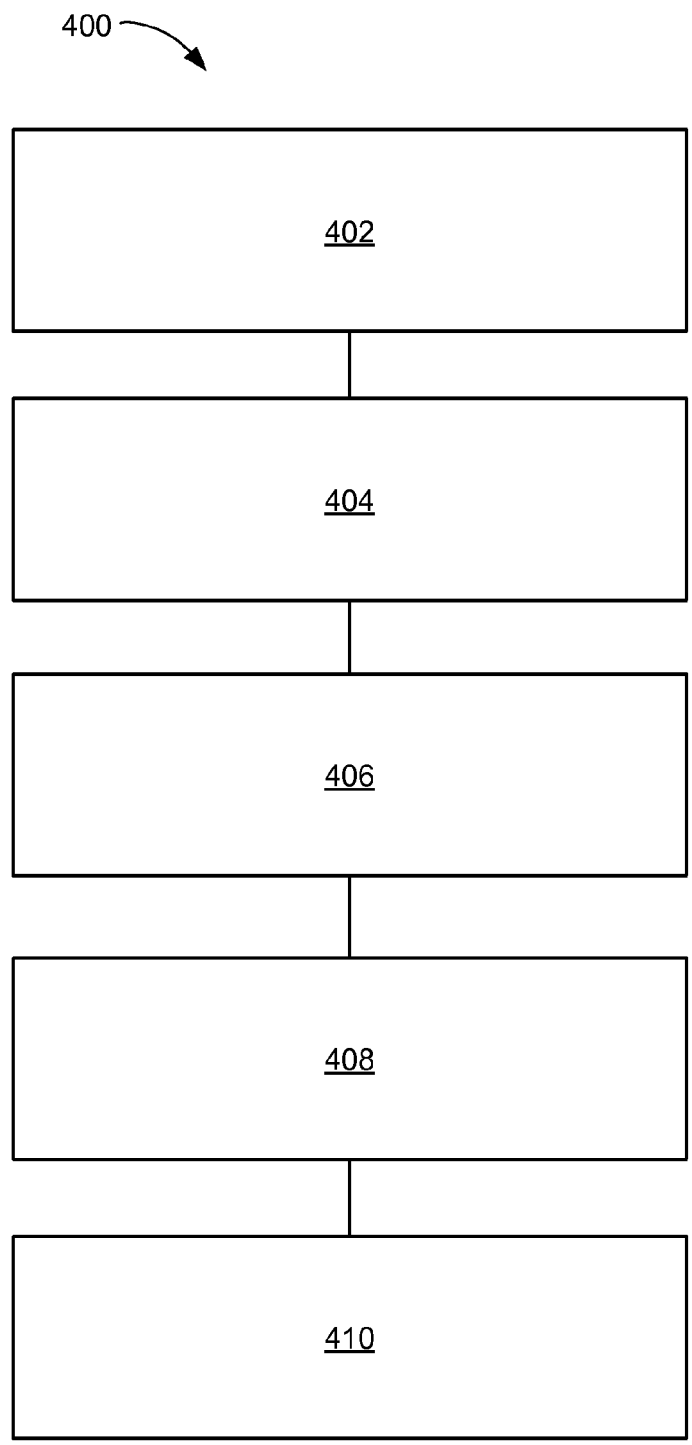
FIG. 4 is a flow chart of a method of operation of a video transmission system in a further embodiment of the present invention.

Referring now to FIG. 4, therein is shown a flow chart of a method 400 of operation of a video transmission system in a further embodiment of the present invention. The method 400 includes: encoding a first video frame for generating a first encoded video frame and a color frame reference including dynamically partitioning the color space of the first video frame in a block 402; generating a subsequent encoded video frame by differentially encoding a resampled color frame reference, from the color frame reference, and a subsequent video frame in a block 404; accessing a video stream transport by multiplexing the first encoded video frame and the subsequent encoded video frame in a block 406; generating a decoded video stream by capturing the resampled color frame reference, for decoding the video stream transport, by applying the subsequent encoded video frame to the resampled color frame reference in a block 408; and presenting on a display the decoded video stream from the video stream transport in a block 410.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically operating video transmission systems fully compatible with conventional encoding and decoding methods or processes and technologies.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a video transmission system comprising:

encoding a first video frame for generating a first encoded video frame and a color reference frame including dynamically partitioning a color space of the first video frame;

generating a subsequent encoded video frame by differentially encoding a resampled color frame reference, from the color reference frame, and a subsequent video frame;

accessing a video stream transport by multiplexing the first encoded video frame and the subsequent encoded video frame;

generating a decoded video stream by capturing the resampled color frame reference, for decoding the video stream transport, by applying the subsequent encoded video frame to the resampled color frame reference;

presenting on a display the decoded video stream from the video stream transport; and analyzing a partition of the color space of the first video frame for determining a $C_b$ partition based on an average value of a Chroma $C_b$ range of the first video frame, wherein the color space can include two or more of the partitions.

2. The method as claimed in claim 1 wherein dynamically partitioning the first video frame includes calculating the color reference frame by a color difference predictor unit.

3. The method as claimed in claim 1 further comprising processing base frame parameters by dynamically adjusting a $C_b$ partition and a $C_r$ partition for the color reference frame.

4. The method as claimed in claim 1 further comprising activating a reference capture unit includes combining the subsequent encoded video frame with the first encoded video frame.

5. A method of operation of a video transmission system comprising:
- encoding a first video frame for generating a first encoded video frame and a color reference frame including dynamically partitioning a color space of the first video frame;
- generating a subsequent encoded video frame by differentially encoding a resampled color frame reference, from the color reference frame, and a subsequent video frames including partitioning a Chroma $C_b$ range and a Chroma $C_r$ range for identifying a base layer reference of the subsequent video frames;
- accessing a video stream transport by multiplexing the first encoded video frame and the subsequent encoded video frame including transmitting through a wired transport, a wireless transport, or a digital video disk (DVD);
- generating a decoded video stream by capturing the resampled color frame reference, for decoding the video stream transport, and applying the subsequent encoded video frame to the resampled color frame reference including differentially decoding the subsequent encoded video frame with a look-up table in a reference capture unit;
- presenting on a display the decoded video stream from the video stream transport; and
- analyzing a partition of the color space of the first video frame for determining a $C_b$ partition and a $C_r$ partition based on an average value of the Chroma $C_b$ range, and an average value of the Chroma $C_r$ range of the first video frame, wherein the color space can include two or more of the partitions.

6. The method as claimed in claim 5 wherein dynamically partitioning the first video frame includes calculating a color reference frame by a color difference predictor unit with base frame parameters including a Luminance (Y) range, the Chroma $C_b$ range, and the Chroma $C_r$ range.

7. The method as claimed in claim 5 further comprising processing base frame parameters by dynamically adjusting a $C_b$ partition and a $C_r$ partition for the color reference frame including calculating an equal step of a Luminance (Y) axis and a 2×2 partition of the Chroma $C_b$ range, and the Chroma $C_r$ range.

8. The method as claimed in claim 5 further comprising activating the reference capture unit includes combining the subsequent encoded video frame with the first encoded video frame for calculating the decoded video stream.

9. A video transmission system comprising:
- a base layer encoder unit encodes a first video frame for generating a first encoded video frame and a color reference frame including dynamically partitioning a color space of the first video frame;
- an enhancement layer encoding unit, coupled to the base layer encoder unit, for generating a subsequent encoded video frame by differentially encoding a resampled color frame reference, from the color reference frame, and a subsequent video frame;
- a video stream transport accessed by a bit stream multiplex unit for multiplexing the first encoded video frame and the subsequent encoded video frame;
- a reference capture unit, coupled to the video stream transport, to generate a decoded video stream by capturing the resampled color frame reference, for decoding the video stream transport, by applying the subsequent encoded video frame to the resampled color frame reference;
- a display, coupled to the reference capture unit and the decoded video stream from the video stream transport, for displaying the decoded video stream; and
- a color difference predictor unit, coupled to the enhancement layer encoding unit, for analyzing a partition of the color space of the first video frame for determining a $C_b$ partition based on an average value of a Chroma $C_b$ range of the first video frame, wherein the color space can include two or more of the partitions.

10. The system as claimed in claim 9 further comprising a base layer reference register, coupled to the enhancement layer encoding unit, for dynamically partitioning the first video frame including the color reference frame calculated by a color difference predictor unit.

11. The system as claimed in claim 9 further comprising a base layer reference register, coupled to the base layer encoder unit, includes base frame parameters processed by a $C_b$ partition and a $C_r$ partition dynamically adjusted for the color reference frame.

12. The system as claimed in claim 9 wherein the reference capture unit, of a video decoder, combines the subsequent encoded video frame with the first encoded video frame.

13. The system as claimed in claim 9 further comprising:
- a first input color space unit, coupled to the base layer encoder unit, captures the first video frame for dynamically partitioning the color space of the first video frame;
- a second input color space unit, coupled to the enhancement layer encoding unit, for providing the subsequent video frames;
- a bit stream multiplexer, coupled to the base layer encoder unit and the enhancement layer encoding unit, for accessing the video stream transport includes a wired transport, a wireless transport, or a digital video disk (DVD) accessed; and
- a video decoder, coupled to the video stream transport, having the reference capture unit.

14. The system as claimed in claim 13 further comprising a base layer reference register, coupled to the enhancement layer encoding unit, for dynamically partitioning the first video frame by base frame parameters loaded from the first video frame to a color difference predictor unit.

15. The system as claimed in claim 13 further comprising a base layer reference register, coupled to the base layer encoder unit, includes base frame parameters with a $C_b$ partition and a $C_r$ partition for the color reference frame calculated by a color difference predictor unit.

16. The system as claimed in claim 13 wherein the reference capture unit, of the video decoder, adds the subsequent encoded video frame to the first encoded video frame for calculating the decoded video stream.

* * * * *

UNITED STATES PATENT AND TRADEMARK OFFICE
CERTIFICATE OF CORRECTION

PATENT NO. : 9,584,817 B2
APPLICATION NO. : 14/541741
DATED : February 28, 2017
INVENTOR(S) : Cheung Auyeung Page 1 of 1

It is certified that error appears in the above-identified patent and that said Letters Patent is hereby corrected as shown below:

In the Specification

Column 6 at Line 63; the value "$G_{r0}$" should read -- $C_{r0}$ --.

Signed and Sealed this
Seventeenth Day of April, 2018

Andrei Iancu
*Director of the United States Patent and Trademark Office*